June 2, 1931. J. M. AUFIERO 1,808,335
ELECTRICAL CONNECTING MEMBER
Filed Nov. 18, 1927
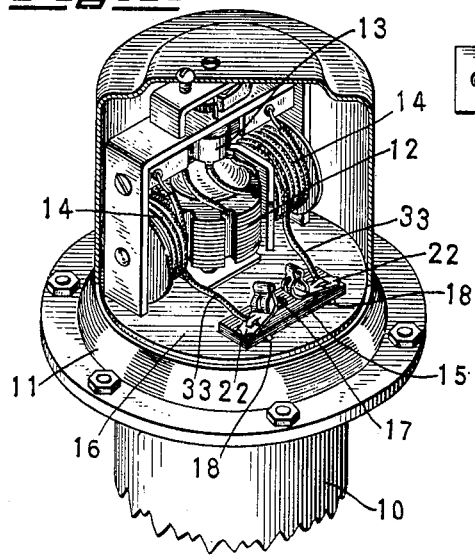
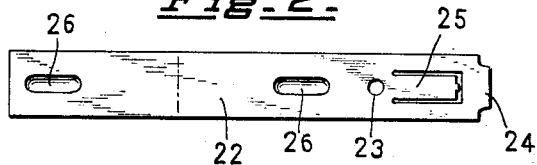
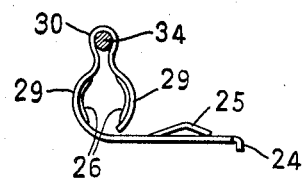
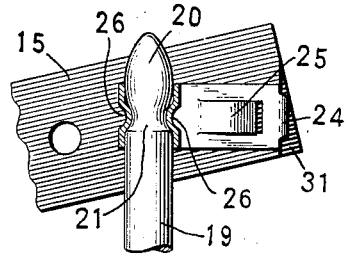
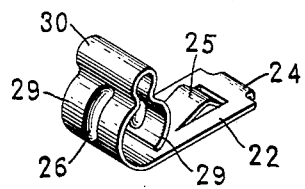
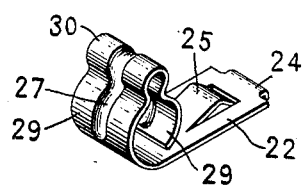
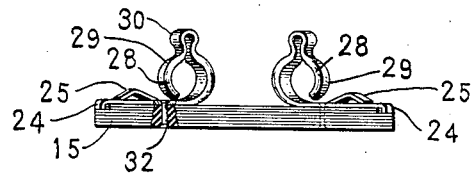
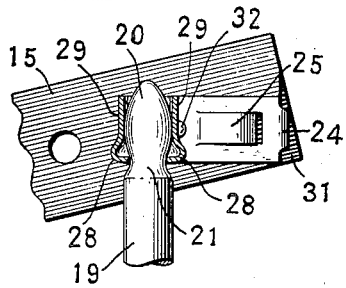
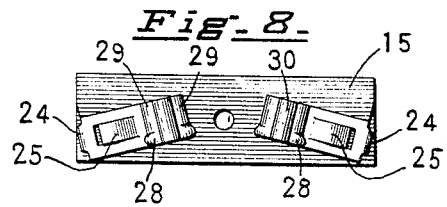
INVENTOR.
John M. Aufiero
BY
ATTORNEYS.

Patented June 2, 1931

1,808,335

UNITED STATES PATENT OFFICE

JOHN M. AUFIERO, OF BROOKLYN, NEW YORK, ASSIGNOR TO E. A. LABORATORIES, INC., OF BROOKLYN, NEW YORK, A CORPORATION OF NEW YORK

ELECTRICAL CONNECTING MEMBER

Application filed November 18, 1927. Serial No. 234,062.

This invention relates to a connecting member and aims, specifically, to provide an improved device of this character for use in connection with electrical appliances and, particularly, warning horns of the automobile type, it being obvious, however, that the invention may be employed in other associations.

An object of the invention is that of furnishing a connecting member of improved construction and by means of which two connecting elements of an electrical circuit may be coupled or detached readily from each other and which, when so attached, will remain connected without danger of becoming accidentally separated.

It is a further object of the invention to provide a device of this character which will be of extreme simplicity and be capable of being constructed economically, but which will incorporate rugged qualities permitting of its use over long periods of time with freedom from difficulties, aside from the fact that the connecting member may be readily placed in any desired association.

With these and further objects in mind reference is had to the attached sheet of drawings illustrating several practical embodiments of the invention and in which:

Figure 1 is a perspective view of the upper end of a warning horn of the automobile type and showing a connecting member of the present invention applied thereto.

Fig. 2 is a face view of the strip from which the connecting member is formed and showing the same subsequent to being blanked out, but prior to shaping.

Fig. 3 is an enlarged edge view of the connecting member.

Fig. 4 is a transverse sectional view of a connecting member embodying the constructions of the present invention.

Fig. 5 is an enlarged perspective view of a connecting member of the order shown in Fig. 1.

Fig. 6 is a similar perspective view of a slightly different form of connecting member;

Figs. 7 and 8 are front and plan views, respectively, of connecting member assemblies of a similar character shown in Fig. 1, and Fig. 9 is a view similar to Fig. 4, but showing the construction illustrated in Figs. 7 and 8.

With primary reference to Figure 1, 10 indicates the trumpet of a horn with which there is associated a flanged diaphragm assembly 11, the diaphragm (not shown) being actuated by a suitable mechanism by means of an armature shaft, which latter mounts an armature 12 and commutator 13. Adjacent these elements there may be provided motor coils 14, the parts being connected so that, when a current passes through the several windings, the armature will be revolved to actuate the horn diaphragm. The foregoing is merely illustrative of the association in which a connecting member of the present invention may be placed.

This connecting member assembly may, as shown, include a mounting block 15 of suitable insulating material, which is conveniently secured to a supporting surface 16 as, for example, by a bolt 17. In order to prevent sidewise shifting of the block with respect to the mounting surface therefor, the latter is preferably formed with upwardly struck lug portions 18 which bear against the edges of the block at opposite sides of the center thereof as defined by the securing member 17, it being thus obvious that a suitable anchoring structure is provided economically.

One part of the connecting member, per se, embraces conveniently, as shown in Figures 4 and 9, a stem or plug 19 having a tapered end portion 20 to the rear of which an annular groove 21 is formed. The other part of the connecting member includes, according to the present invention, preferably a strip 22 formed with an opening 23. This strip is furthermore provided with a downwardly extending end portion 24 and an up-struck tongue 25, the latter being conveniently disposed between the opening thereof and the downwardly struck end portion. The body of the strip is inwardly bulged and according to the showing in Figures 1, 2 and 5, this bulging may be in the form of a pair of isolated and aligned portions 26 extending centrally of the strip. According to the showing in Figure 6, this bulged portion may optionally be in the form of a single continuous depression, as at 27 or, as shown in Figures 7, 8 and 9, such portion may be in the form of a flange 28 adjacent one of the side edges of the strip body.

A strip thus formed is bent in any suitable manner to provide a pair of substantially semi-circular enclosing portions 29 connected and urged towards each other by a portion 30 which exerts a spring influence. The semi-circular, or enclosing portions 29 are so proportioned that the rib structure provided by the inwardly bulged portion or portions of the strip defines a space substantially equal in diameter to the diameter of the groove 21.

With a view to securing the strip portion of the connecting member to the mounting block or other surface with which it is associated, the latter is preferably formed with slot or cut-out portions 31 (in the present exemplification adjacent each of its ends) and of a depth sufficient to accommodate the downwardly extending portion 24 at the end of the strip. As shown in Figures 7 and 9, an anchoring member in the nature of a rivet 32 is secured to the block 15 and has its shank extending through the opening 23, the end of this shank being headed. As a consequence it will be apparent that the strip portion of the connecting member cannot turn with respect to the mounting block, incident to the anchoring member 32 and the downwardly struck portion 24, which cooperate to prevent such an occurrence.

As shown in Figure 1, with the connecting member assembly in position, the ends of the leads 33 extending from the coils 12 may be passed under the tongues 25, which are then struck smartly to deform the same, as well as the end of the wire which passes thereunder, thus locking these elements against accidental detachment. As indicated in Figure 3, however, if desired, the end of the lead may pass into the space defined by the central connecting portion 30, at which point this lead may be soldered, as at 34. By such a construction it is obvious that the connecting portion will be rigidified additionally in order to prevent a springing of the semi-circular portions 29 to a point at which accidental detachment of the stem 19 from the connecting strip might occur. Such strengthening of the connecting portion will also follow where the inwardly bulged portion or rib extends throughout the semi-circular portions, as well as the connecting portion as shown at 27 in Figure 6.

Thus a connecting member is provided by means of which the objects of the present invention are achieved. It will be understood that numerous changes in construction and re-arrangement of the parts, additional to those illustrated, might be resorted to without departing from the spirit of the invention as defined by the claim.

Having described my invention, what I claim as new and desire to secure by Letters Patent is:

A connecting member including a strip of conducting material having portions of its surface bulged inwardly and said strip being bent adjacent such portions to provide complementary and substantially semi-circular plug-enclosing parts, the said inwardly bulged portions providing flanges for yieldingly engaging a reduced portion of a plug and said strip extending to have its free end present a surface for securing to a mounting member.

In testimony whereof I affix my signature.

JOHN M. AUFIERO.